(12) United States Patent
Thomas et al.

(10) Patent No.: US 12,003,279 B2
(45) Date of Patent: Jun. 4, 2024

(54) COMMON-MODE CURRENT ADJUSTMENT IN A RECEIVER

(71) Applicant: HEWLETT PACKARD ENTERPRISE DEVELOPMENT LP, Houston, TX (US)

(72) Inventors: David Ritter Thomas, Fort Collins, CO (US); Laurel Abeyta, Loveland, CO (US); Jason Douglas Jung, Fort Collins, CO (US); Kit Maccarthy Morton, Fort Collins, CO (US); Daniel Alan Berkram, Loveland, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 155 days.

(21) Appl. No.: 17/694,866

(22) Filed: Mar. 15, 2022

(65) Prior Publication Data

US 2023/0299856 A1   Sep. 21, 2023

(51) Int. Cl.
*H04B 10/69* (2013.01)
(52) U.S. Cl.
CPC ......... *H04B 10/697* (2013.01); *H04B 10/691* (2013.01)
(58) Field of Classification Search
CPC ........................... H04B 10/691; H04B 10/697
USPC ........................................................ 398/194
See application file for complete search history.

(56) References Cited

U.S. PATENT DOCUMENTS 9,523,867 B2   12/2016   Nagarajan et al.
9,553,670 B2   1/2017   Nagarajan
9,722,722 B2   8/2017   Way
9,933,639 B1   4/2018   Lin et al.
10,054,806 B2   8/2018   Lin et al.
(Continued)

FOREIGN PATENT DOCUMENTS

WO   WO-2016044822   3/2016
WO   WO-2018132158   7/2018

OTHER PUBLICATIONS

Lin et al; A 10-GB/s Eye-Opening Monitor Circuit for Receiver Equalizer Adaptations in 65-nm CMOS ; Jan. 2020; IEEE; pp. 1-12. (Year: 2020).*

(Continued)

*Primary Examiner* — Amritbir K Sandhu
(74) *Attorney, Agent, or Firm* — Sheppard Mullin Richter & Hampton LLP (57) ABSTRACT

Examples described herein relate to a method and a system for removing the common-mode current. The receiver includes a photodetector, a common-mode adjustment circuit, an analog front-end, an eye scan circuit, and a control unit. The photodetector generates an input photocurrent responsive to a received optical signal. The common-mode adjustment circuit generates an adjusted input current based on the input photocurrent. The analog front-end generates a differential voltage based on the adjusted input current. Based on the differential voltage, the eye scan circuit generates an eye scan information defining a first outer eye and a second outer eye in an eye diagram. The control unit tunes the common-mode adjustment circuit based on a relative height metric of a first height of the first outer eye and a second height of the second outer eye to remove a portion of the common-mode current from the input photocurrent.

18 Claims, 7 Drawing Sheets

(56) References Cited

U.S. PATENT DOCUMENTS

| | | |
|---|---|---|
| 10,116,391 B2 | 10/2018 | Rope et al. |
| 10,651,949 B1* | 5/2020 | Thomas ............. H04B 10/0731 |
| 10,720,995 B1 | 7/2020 | Mazzini et al. |
| 10,992,501 B1* | 4/2021 | Sun ........................... H03L 7/07 |
| 11,070,288 B1* | 7/2021 | Guzzon ................. H04B 10/40 |
| 11,646,756 B1* | 5/2023 | Morton ................ H04B 10/695 |
| | | 375/287 |
| 2017/0063466 A1* | 3/2017 | Wang ................... H04B 10/564 |
| 2018/0262373 A1* | 9/2018 | Shibasaki ............. H04L 7/0334 |
| 2020/0099449 A1 | 3/2020 | Way et al. |
| 2020/0358639 A1* | 11/2020 | Yamazaki ......... H04L 25/03057 |

OTHER PUBLICATIONS

Lin et al.; 10-GB/s Eye-Opening Monitor Circuit for Receiver Equalizer Adaptations in 65-nm CMOS; Jan. 2020; IEEE; pp. 1-12. (Year: 2020).*

* cited by examiner

COMMON-MODE CURRENT ADJUSTMENT IN A RECEIVER

BACKGROUND

Optical systems include optical devices that can generate, process, and/or carry optical signals from one point to another point. In certain implementations, optical systems such as optical communication systems may facilitate data communication over longer distances with higher bandwidth using smaller cable width (or diameter) in comparison to communication systems using electrical wires. In an optical communication system, light may be generated by a light source such as a laser. The light may be modulated and/or encoded by an optical transmitter, transmitted over an optical communication link, and demodulated and/or decoded by an optoelectronic receiver that includes photosensitive devices, for example. Transmission of data signals via the communication link commonly suffers from undesirable signal impairments (e.g., attenuation, noise, etc.) that deteriorate the quality of the data signals.

BRIEF DESCRIPTION OF THE DRAWINGS

Various examples will be described below with references to the following figures.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, the same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Data may be communicated across an optical communication link. In computer systems, such communication links may form part of a physical layer and be implemented by physical layer electronics. The physical layer defines how bits are to be transmitted and received over an optical transmission medium such as an optical fiber. For optical communications, optical transmitters may be configured to convert electrical impulses into optical signals, which may then be received by optoelectronic receivers over the optical communication links and converted back into electrical impulses to enable data sampling. Optical communication links may be used within computing devices, for example, to implement a systems bus, and/or to network different computing devices. Use of a serializer/deserializer (SERDES) circuitry in optoelectronic communication systems (e.g., a serializer circuit at a transmitter and a deserializer circuit at a receiver) allows high-speed communications.

Optical signals received at an optoelectronic receiver (also referred to as "receiver" hereinafter) in the computing systems often differ from a transmitted signal due to signal impairments such as attenuation, distortion, and noise. Such signal impairments may cause various changes that degrade the quality of the optical signals and the overall performance of the receiver. The performance of a communication device such as the receiver is usually measured in terms of Bit Error Rate (BER) which represents the ability of the communication device to pass bits without errors. For high-speed data communication systems such as systems that use multi-level pulse amplitude modulation (PAM) or multi-PAM format (e.g., Pulse Amplitude Modulation 4-level (PAM4)), these signal impairments may be more prominent due to high data rates and cause high BER.

Typically, a receiver (e.g., an optoelectronic SERDES receiver) includes a photodetector (e.g., photodiode) to detect an incoming optical signal and generate a photocurrent (hereinafter referred to as an input photocurrent) that is responsive to an optical power of the received optical signal. To capture a data signal correctly, the receiver includes data samplers to compare the signal received by the data sampler with one or more sampling thresholds to interpret a symbol corresponding to the received signal. In communication systems using PAM4 format, the data samplers interpret the signal received at its input as one of the digital symbols from 00, 01, 10, and 11 based on three sampling thresholds. Generally, the input photocurrent generated by the photodetector includes a common-mode current. The common-mode current is a direct current (DC) bias in the input photocurrent. The common-mode current is preferably maintained at a predetermined magnitude. The magnitude of the common-mode current affects the performance of the analog front-end (AFE). An AFE is circuitry that processes the photocurrent to enhance the signal quality of the photocurrent and perform the signal conversion (e.g., current to voltage conversion). If the magnitude of the common-mode current is too great, the AFE may distort the signal. If the signal is distorted, there is a risk that the BER of the receiver will also increase. Therefore, maintaining the signal at the predetermined level may be useful to keep signal distortions to an acceptably low level.

In accordance with one or more examples presented herein, a method and an optoelectronic receiver for removing the common-mode current from an input photocurrent are presented. In some examples, the optoelectronic receiver includes a photodetector, a common-mode adjustment circuit, an AFE, an eye scan circuit, and a control unit communicatively coupled to the common-mode adjustment circuit, the AFE, and the eye scan circuit. The photodetector receives an optical signal (e.g., an optical signal carrying PAM4 encoded data signal) and generates an input photocurrent. The common-mode adjustment circuit receives the input photocurrent from the photodetector and generates an adjusted input current by reducing a common-mode current from the input photocurrent. The AFE generates a differential voltage based on the adjusted input current.

The eye scan circuit performs an eye scan to generate an eye scan information based on the differential voltage received from the AFE. The eye scan information is representative of the distribution of the probability of the differential voltage having a given voltage value at a given phase offset. The given phase offset refers to a time offset between a time when the signal is sampled and a predefined point of a unit interval (UI). The predefined point may be any of a beginning time, a middle time, or an end time of the UI. The eye scan information may be represented in the form of an eye diagram. In particular, an eye diagram resulting from the eye scan information derived based on the PAM4 encoded data signal includes three eyes—a first outer eye, second outer eye, and a center eye formed between the first outer eye and the second outer eye.

The control unit determines a first height of the first outer eye and a second height of the second outer eye based on respective signal voltage levels (as will be described in greater detail later). In response to determining that a relative height metric (e.g., a height difference or a height ratio) between the first height and the second height is greater than a threshold value, the control unit updates a common-mode calibration (CMC) value based on the first height and the second height. The control unit controls the common-mode adjustment circuit to remove a portion of the common-mode current from the input photocurrent based on the CMC value. In one example, the control unit controls the common-mode adjustment circuit to adjust the common-mode current such that a level of the common-mode current in the adjusted input current generated by the common-mode adjustment circuit is maintained lower than or equal to a predetermined magnitude. The predetermined magnitude may be a level of the DC bias that can be processed by downstream processing circuitry, such as, the AFE without introducing signal distortions or limiting signal distortions to a certain acceptable threshold.

In some examples, the control unit of the proposed receiver tunes the common-mode adjustment circuit based on the eye scan information to remove the common-mode current from the input photocurrent to bring the adjusted input current within an input operating range of the AFE. In particular, the control unit continues to tune the common-mode adjustment circuit until the heights of the first outer eye and the second outer eye become similar or substantially similar to each other. When the heights of the first outer eye and the second outer eye become similar or substantially similar to each other, the level of the common-mode current in the adjusted input current becomes lower than or equal to a predetermined magnitude, causing the adjusted input current to remain within the input operating range of the AFE. Accordingly, the AFE can process the adjusted input current and thereby generate a differential voltage with enhanced signal quality. As the common-mode current is reduced to remain lower than or equal to a predetermined magnitude, the AFE generates the differential voltage with reduced distortions. The eye scan circuit will thus generate the eye scan information with reduced distortions, which is fed back to the control unit to further update the CMC value and tune the common-mode adjustment circuit until the adjusted input is brought within an input operating range of the AFE. In particular, due to such an adjustment of the common-mode current and reduced distortions in the signal processing, the BER of the receiver also reduces.

Figure 1:
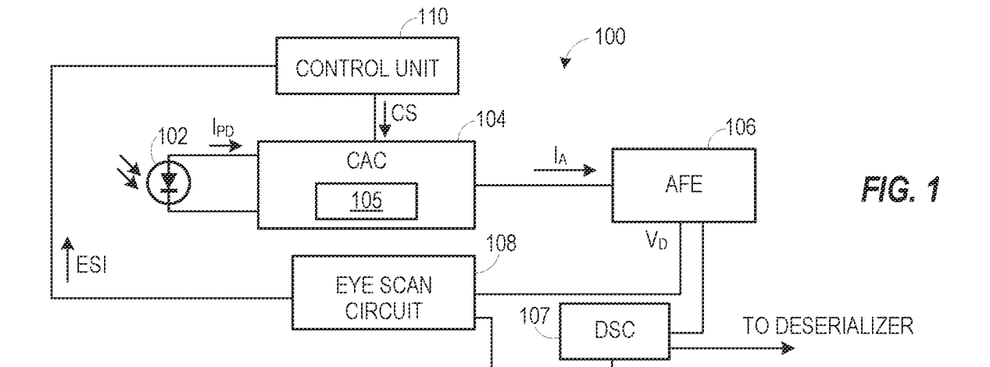
FIG. 1 is a block diagram of an example optoelectronic receiver.

Referring now to the drawings, FIG. 1 depicts an example optoelectronic receiver 100. The optoelectronic receiver 100 may be a stand-alone optoelectronic receiver or be part of an optoelectronic transceiver module. In some examples, the optoelectronic receiver 100 may be a SERDES receiver. In this description, the terms "optoelectronic receiver" and "receiver" are used interchangeably. In the example of FIG. 1, the receiver 100 includes a photodetector 102, a common-mode adjustment circuit 104 (labeled as CAC in FIG. 1), an AFE 106, a data sampling circuit (DSC) 107, an eye scan circuit 108, and a control unit 110.

The photodetector 102 may include one or more photodiodes. The photodetector 102 detects light carrying optical signal) transmitted over an optical communication link (not shown), such as a fiber optic cable. The light carries a data signal which may be a multi-level PAM encoded signal. For illustration purposes, the data signal carried by the light received by the photodetector 102 is described as being a PAM4 signal. The photodetector 102 converts the optical signal received over the optical communication link into an electrical signal that is referred to as an input photocurrent ($I_{PD}$). For the PAM4 data signal, the input photocurrent is expected to have one of four amplitude levels in each UI.

To reduce any adverse impact of the signal distortions and the common-mode current (i.e., DC bias) on the performance of the receiver 100, the input photocurrent is processed through circuits such as the common-mode adjustment circuit 104 and the AFE 106. For example, to reduce a BER of the receiver 100, it is useful to control the common-mode current from the input photocurrent. In particular, the common-mode adjustment circuit 104 is coupled to the photodetector 102 to receive the input photocurrent from the photodetector 102. The common-mode adjustment circuit 104 may include one or more electronic components that process the input photocurrent to remove at least a portion of the common-mode current from the input photocurrent and output a CM adjusted current, hereinafter referred to as an adjusted input current ($I_A$). The common-mode adjustment circuit 104 is controlled based on a CMC value that it receives from the control unit 110.

In some examples, the common-mode adjustment circuit 104 may include a variable current source 105 that draws a portion of the input photocurrent depending on the CMC value. The current source may be implemented using a digital-to-analog converter (DAC, not shown) and the CMC value may include a digital variable (e.g., an integer within an input range for the DAC). In this case, the CMC value may comprise the digital control value (e.g., a binary-encoded value) supplied to the DAC.

The amount of the increment and/or decrement in the CMC value may be set as a configurable parameter of the receiver 100 and is hereinafter referred to as a predetermined value. In one case, the amount of the increment and decrement may be one DAC integer step (e.g., +1 or −1). The common-mode adjustment circuit 104 may be configured such that adjusting the variable current source 105 by updating the CMC value changes a current component that is removed from the input photocurrent $I_{PD}$ (e.g., increases or decreases a given negative bias). During initialization of the receiver 100, the control unit 110 may set the CMC value to a baseline amount which, in one example, may be a value in the middle of the range of the CMC values. For example, for a range of CMC values between 0 and 255, the control unit 110 may set the CMC baseline amount to 128. In some examples, the control unit 110 may algorithmically determine the CMC baseline amount as a non-limiting example.

The AFE 106 is coupled to, the common-mode adjustment circuit 104 to receive the adjusted current. The AFE 106 may include analog circuits to condition (e.g., enhance signal quality of) the adjusted input current by minimizing or removing the distortions and amplifying the adjusted input current. In some examples, the AFE 106 may include circuits, such as, one or more signal amplifiers, signal equalizers, current-to-voltage converters, single-ended to differential voltage converters, or combinations thereof. In particular, in the receiver 100 of FIG. 1, the AFE 106 processes the adjusted input current to generate a differential voltage ($V_D$).

In some examples, both the data sampling circuit 107 and the eye scan circuit 108 are coupled to the AFE 106 to receive the differential voltage. In some examples, the data sampling circuit 107 may be a single electronic circuit or a combination of a plurality of electronic circuits that may decode a data symbol (e.g., 00, 01, 10, 11, in the case of the PAM4 data signal) from the differential voltage for each UI. The eye scan circuit 108 may also include one or more circuits to generate eye scan information (ESI) that is representative of the distribution of the probability of the signal (e.g., the differential voltage) having given voltage value at a given phase offset. The given phase offset refers to a time offset between a time when the signal is sampled and a predefined point of the UI. The predefined point may be any of a beginning time, a middle time, or an end time of the UI. Details of the generation of the eye scan information are described in conjunction with FIG. 3.

The control unit 110 adjusts the removal of the common-mode current from the input photocurrent via the common-mode adjustment circuit 104 based on the eye scan information. In one example, the control unit 110 may be implemented in the form of a microcontroller comprising one or more processors and a machine-readable storage medium that stores a processor-executable receiver training program code. The receiver training program code may include instructions which when executed by the microcontroller cause the microcontroller to send a control signal (CS) to the common-mode adjustment circuit 104 to adjust the amount of the common-mode current removed from the input photocurrent. In another example, the control unit 110 may be implemented via one or more processors and a machine-readable storage medium storing the receiver training program code. In another example, the control unit 110 may be implemented via electronic circuits and devices, such as, digital logic circuits, digital subtractors, comparators, counters, and the like. In yet another example, the control unit 110 may be implemented in the form of an Application Specific Integrated Circuit (ASIC), system-on-chip (SOC), a Field Programmable Gate Array (FPGA), or the like, to receive the eye scan information from the eye scan circuit 108 and to supply the CMC value to the common-mode adjustment circuit 104 to control removal of the common-mode current from the input photocurrent. In the description hereinafter, several operations that are described as being performed by the control unit 110 may be performed using any or combinations of the implementations of the control unit 110 listed hereinabove.

Figure 2A:
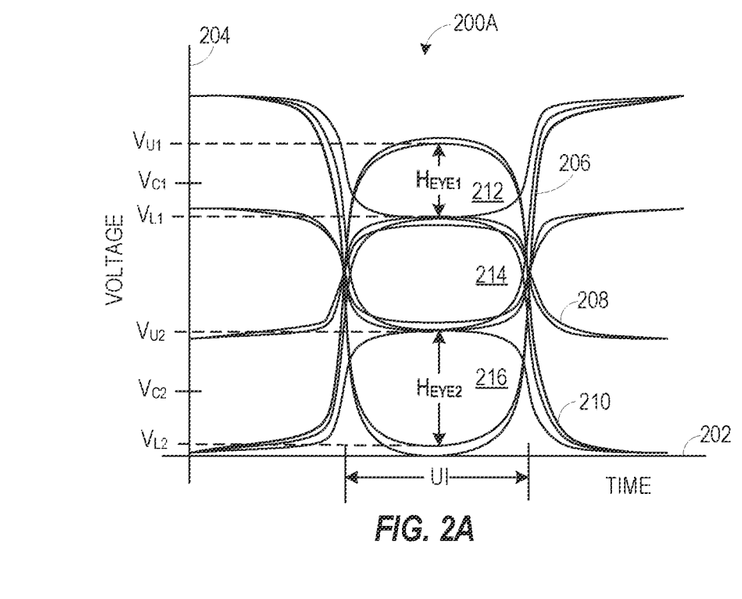
FIGS. 2A and 2B are graphical representations depicting example eye diagrams for a receiver for different tunings of a common-mode adjustment circuit.
Figure 2B:
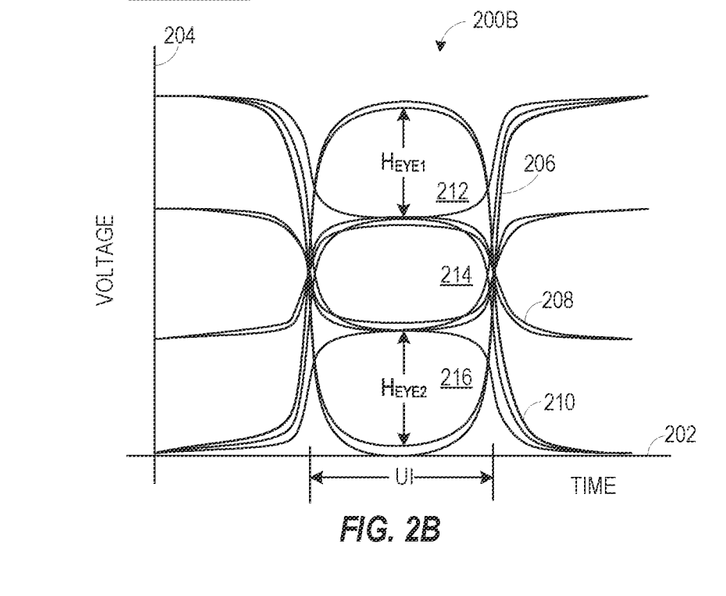

The eye scan information that is useful to the control unit 110 to tune the common-mode adjustment circuit 104 may be represented in the form of an eye diagram (see FIGS. 2A and 2B). In particular, the eye diagram is a graphical representation of the eye scan information. For descriptive purposes, FIGS. 2A and 2B are referenced concurrently with the FIG. 1. In particular, FIGS. 2A and 2B respectively depict example eye diagrams 200A and 200B for the receiver 100 of FIG. 1 for different tunings of the common-mode adjustment circuit 104. In both the eye diagrams 200A and 200B, the X-axis 202 represents time measured in UI of a sample period, and the Y-axis 204 represents voltage levels. Wave lines 206, 208, and 210 (although there are many, only three wave lines are labeled for illustration purposes) represent how the PAM4 data signals are received, for example, as a result of repetitively sampling the received PAM4 data signals comprising a random sequence of symbols 00, 01, 10, and 11. As may be seen, the originally rectangular waveforms are "smeared" by the channel effects to become more saw-tooth-like. In some examples, when performing an eye scan by the eye scan circuit 108, data may be generated referred to as eye scan information) indicating at what voltage levels the wave lines 206, 208, and 210 intersect or overlap with each other during the UI.

The region between the two or more of the wave lines 206, 208, and 210 in the UI are referred to as eyes. In the eye diagrams, 200A and 200B, three eyes such as a first outer eye 212, a center eye 214, and a second outer eye 216 can be seen because the data signal carried by the incoming optical signal is PAM4 encoded data signal. The maximum vertical openings (measured as a voltage range on the Y-axis 204) of the eyes 212-216 are hereinafter referred to as eye heights. During a training phase, the control unit 110, for a given eye, may identify the voltage level above and below a center voltage (e.g., sampling threshold) of the given eye where the probability of the signal being sampled at that voltage is greater than a predetermined value. The control unit 110 may determine the height of the given eye as a difference between these two voltages. By way of example, for the first outer eye 212, the control unit 110 may identify a first outer eye upper voltage ($V_{U1}$) and a first outer eye lower voltage ($V_{L1}$) at voltage levels above and below a first eye center voltage ($V_{C1}$) of the first outer eye 212. In particular, a voltage level, above the first eye center voltage, at which the probability of the data signal being greater than the predetermined threshold is identified as the first outer eye upper voltage. Similarly, a voltage level, below the first eye center voltage, at which the probability of the data signal being greater than the predetermined threshold is identified as the first outer eye lower voltage. The first eye center voltage may be equal to a sampling threshold corresponding to the first outer eye 212. The control unit 110 may determine the height of the first outer eye 212 (hereinafter referred to as a first height $H_{EYE1}$) as a difference between voltages $V_{U1}$ and $V_{L1}$.

Similarly, for the second outer eye 216, the control unit 110 may identify a second outer eye upper voltage ($V_{U2}$) and a second outer eye lower voltage ($V_{L2}$) as the voltage levels above and below a second eye center voltage ($V_{C2}$) of the second outer eye 216. The second eye center voltage may be equal to a sampling threshold corresponding to the second outer eye 216. In particular, a voltage level, above the second eye center voltage, at which the probability of the data signal being sampled being greater than the predetermined threshold is identified as second outer eye upper voltage. Similarly, a voltage level, below the second eye center voltage, at which the probability of the data signal being sampled being greater than the predetermined threshold is identified as second outer eye lower voltage ($V_{L1}$). The control unit 110 may determine the height of the second outer eye 216 (hereinafter referred to as second height $H_{EYE2}$) as a difference between voltages $V_{U2}$ and $V_{L2}$.

As can be seen in the eye diagrams 200A and 200B, the eye heights of the first eyes 212 are different from each other. In particular, in FIG. 2A, the first height is smaller than the second height representing poor tuning of the common-mode adjustment circuit 104. In some examples, the control unit 110 tunes the common-mode adjustment circuit 104 based on the eye heights until the outermost eyes in the eye diagram of the receiver 100 have substantially similar or equal eye heights. For example, the eye diagram 200B may be realized in a situation when the common-mode adjustment circuit 104 is tuned by the control unit 110 to restrict the level of the common-mode current in the adjusted input current below the predetermined magnitude.

The control unit 110 determines a relative height metric based on the first height and the second height. In one example, the relative height metric may be a height difference between the first height and the second height. In another example, the relative height metric may be a height ratio of the first height and the second height. Once the relative height metric is determined, the control unit 110 performs a check to determine whether the relative height metric is greater than a threshold value. In response to determining that the relative height metric is greater than the threshold value, the control unit 110 may update the CMC value based on the first height and the second height. Further, the control unit 110 tunes the common-mode adjustment circuit 104 to remove the common-mode current from the input photocurrent based on the CMC value. Additional details of operations performed by the control unit 110 to tune the common-mode adjustment circuit 104 are described in conjunction with the methods of FIGS. 5-8.

Figure 3:
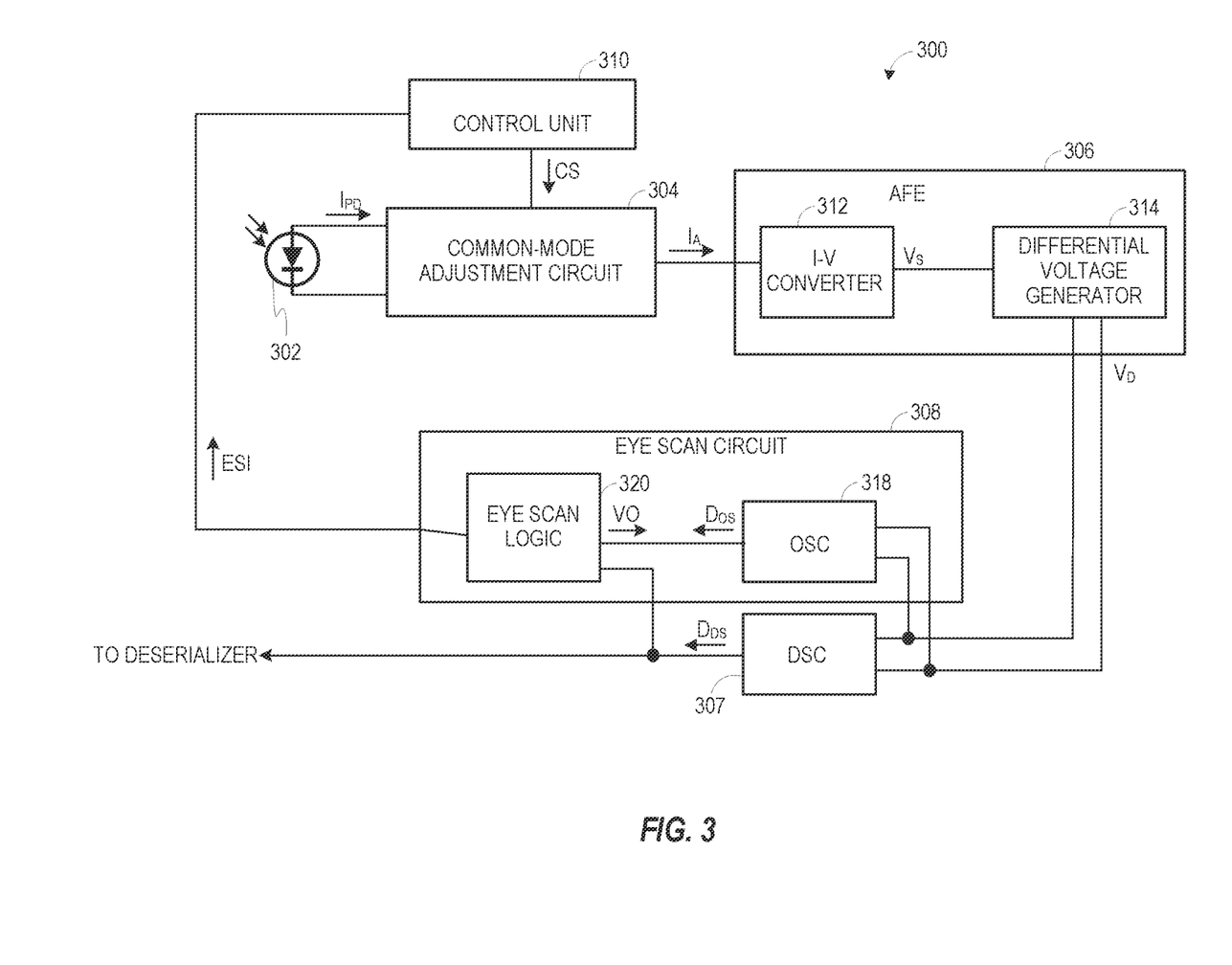
FIG. 3 is a block diagram of another example optoelectronic receiver.

Referring now to FIG. 3, a block diagram of another example receiver 300 is depicted. Further, FIGS. 4A-4D depict graphical representations showing current and/or voltage signals at various stages within the receiver 300 of FIG. 3. In the description hereinafter, FIGS. 4A-4D are referenced concurrently with FIG. 3. The receiver 300 of FIG. 3 may be an example representative of the receiver 100 of FIG. 1 and includes one or more components that are similar to those described in conjunction with the receiver 100 of FIG. 1, a description of which is not repeated herein. For example, the receiver 300 includes a photodetector 302, a common-mode adjustment circuit 304, an AFE 306, a data sampling circuit 307, an eye scan circuit 308, and a control unit 310 that are example representatives of the photodetector 102, the common-mode adjustment circuit 104, the AFE 106, the data sampling circuit 107, the eye scan circuit 108, and the control unit 110 of FIG. 1. In particular, FIG. 3 depicts certain circuits that form the AFE 306 and the eye scan circuit 308. For example, the AFE 306 may include a current-to-voltage converter 312 (labeled as "I-V CONVERTER" in FIG. 3) and a differential voltage generator 314. Further, FIG. 3 also depicts certain circuits such as an offset sampling circuit (OSC) 318 and an eye scan logic circuit 320 that form the eye scan circuit 308.

Figure 4A:
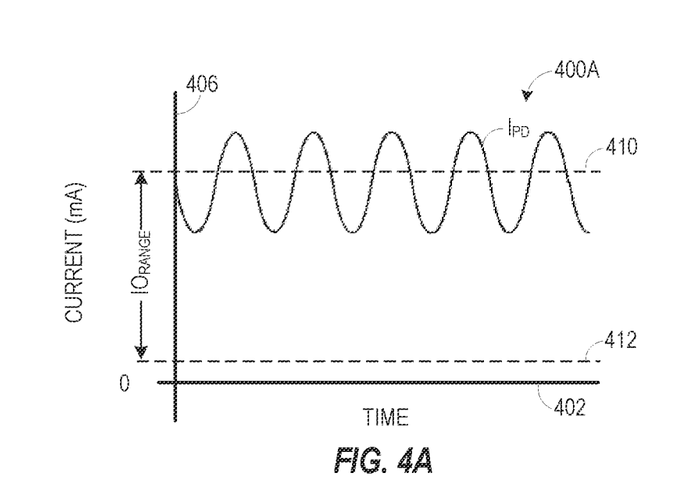
FIGS. 4A-4D are graphical representations showing current and/or voltage signals at various stages within the optoelectronic receiver of FIG. 3.
Figure 4B:
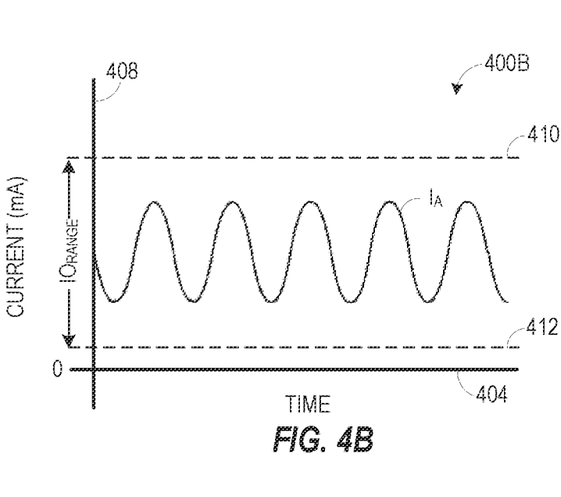
Figure 4C:
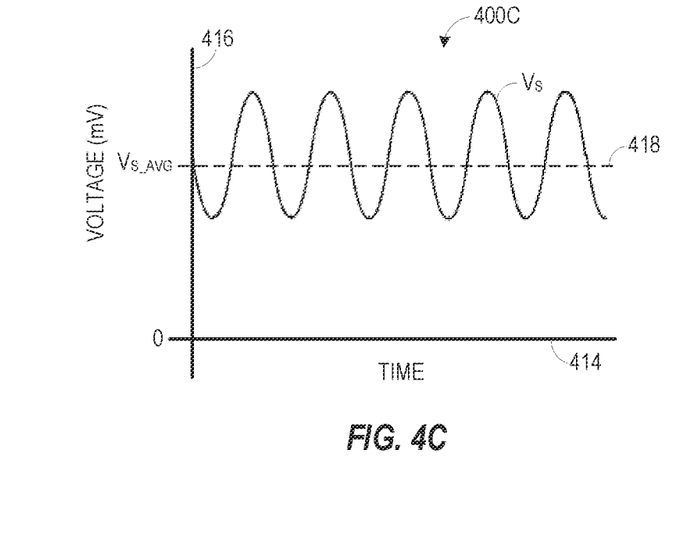
Figure 4D:
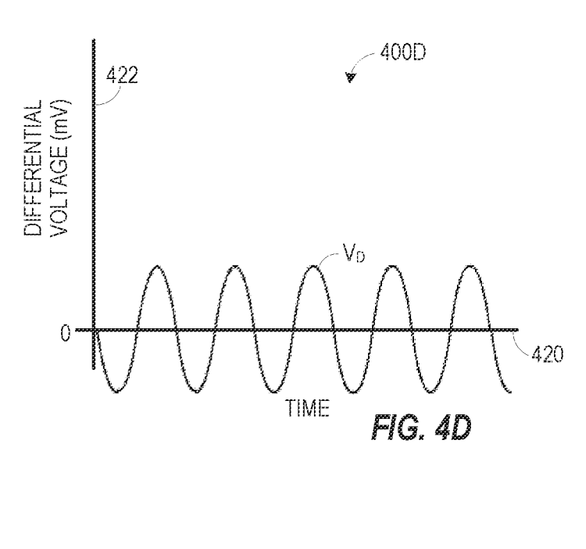

The photodetector 302 may generate an input photocurrent (see FIG. 4A) responsive to an optical signal impinging on the photodetector 302. Also, the common-mode adjustment circuit 304 generates an adjusted input current (see FIG. 4B) by removing a portion of the common-mode current from the input photocurrent. FIGS. 4A and 4B depict graphical representations 400A and 400B showing the input photocurrent and the adjusted input current, respectively. In the graphical representations 400A and 400B, the X-axis 402 and 404 represent time, and the Y-axis 406 and 408 represent current amplitude in mA. Further, current amplitudes marked by the lines 410 and 412 define an input operating range ($IO_{RANGE}$) of the current-to-voltage converter 312. As depicted in the graphical representation 400A, the input photocurrent is outside the input operating range due to the presence of an excessive common-mode current in it. The control unit 110 tunes the common-mode adjustment circuit 304 (see methods of FIGS. 5-8) to remove at least a portion of the common-mode current from the input photocurrent until the adjusted input current is maintained within the input operating range of the current-to-voltage converter 312. The adjusted input current gets confined within the input operating range once the relative height metric (e.g., a height difference or a height ratio) of the first height and the second height is determined to be lower than or equal to the threshold value (e.g., a threshold height difference or a threshold ratio).

The current-to-voltage converter 312 is an electronic circuit that receives a current signal (e.g., $I_A$) as the input and generates a voltage signal as the output. The current-to-voltage converter 312 may be implemented using an operational amplifier (OPAMP) based current to voltage converter circuit, a resistor-based network, or combinations thereof. During the operation of the receiver 100, the current-to-voltage converter 312 receives an adjusted input current from the common-mode adjustment circuit 304 and generates a single-ended voltage ($V_S$) that is depicted in a graphical representation 400C of FIG. 4C. In the graphical representations 400C the X-axis 414 represents time, and the Y-axis 416 represents amplitudes of voltage in mV. A line 418 represents an average voltage ($V_{S\_AVG}$) of the single-ended voltage.

The differential voltage generator 314 is an electronic circuit that is coupled to the current-to-voltage converter 312 to receive the single-ended voltage and generate a differential voltage based on the single-ended voltage. The differential voltage generator 314 may generate the differential voltage by subtracting the average voltage from the single-ended voltage. The differential voltage generator 314 may be implemented using an OPAMP-based inverting buffer or resistor-capacitor low pass filter network, or a combination thereof. The differential voltage is depicted in a graphical representation 400D of FIG. 4D. In the graphical representations 400D, the X-axis 420 represents time, and the Y-axis 422 represents voltage in mV. The differential voltage may be received by the data sampling circuit 307 and the eyes scan circuit 308.

In one example implementation, the data sampling circuit 307 is configured to apply decision logic to the differential voltage to output a first data stream ($D_{DS}$). For example, the data sampling circuit 307 may compare the received differential voltage with a configurable voltage threshold at a configurable sample time. The sample time may be set based on a clock signal (not shown). The first data stream is a stream of symbols (e.g., from 00, 01, 10, or 11 in the case of PAM4 data signal) that represents the data received over the optical communications channel by the photodetector 302. The first data stream may be output by the receiver 300 as a received bit sequence. In some examples, the first data stream may be supplied to a deserializer circuit (not shown) for deserializing the data symbols into a plurality of data streams.

The eye scan logic circuit 320 utilizes the data sampling circuit 307 and the offset sampling circuit 318 to generate an eye scan information to tune the common-mode adjustment circuit 304. The offset sampling circuit 318 of the eye scan circuit 308 is coupled in parallel with the data sampling circuit 307 to receive the differential voltage from the differential voltage generator 314. The offset sampling circuit 318 is configured to output a second data stream ($D_{OS}$). The offset sampling circuit 318 is controllable to use different voltage thresholds from the data sampling circuit 307. For example, the offset sampling circuit 318 may use a common sample time but apply a positive or negative voltage offset.

In the example of FIG. 3, voltage thresholds used by the data sampling circuit 307 may be fixed to predetermined values, for example, to initially-calibrated voltage thresholds whereas the voltage thresholds for the offset sampling circuit 318 is variable. In this example, an eye scan as performed by the eye scan logic circuit 320 comprises applying a positive or negative voltage offset (VO) to the voltage thresholds of the offset sampling circuit 318. After a particular voltage offset is applied by the offset sampling circuit 318, the eye scan logic circuit 320 compares the second data stream obtained using the offset sampling circuit 318 with the first data stream obtained using the data sampling circuit 307.

The eye scan logic circuit 320 is coupled to both the data sampling circuit 307 and the offset sampling circuit 318 and receives the first data stream and the second data stream. Based on the first data stream, the second data stream, and/or internal signals generated inside the data sampling circuit 107 and the offset sampling circuit 318, the eye scan logic circuit 320 may generate the eye scan information that represents a distribution of the probability of a signal (e.g., the differential voltage) having given voltage value at a given phase offset. As previously noted, the given phase offset is a time offset between a time when the signal is sampled and a predefined point (e.g., any of a beginning time, a middle time, or an end time) of the UI. In some implementations, the receiver 300 may include a clock data recovery circuit (not shown) that generates a periodic "clock" signal that has the same period as the received data signal and is aligned to the middle of the UI. The data sampling circuit 307 may be configured to sample incoming signal (e.g., the differential voltage received from the AFE 306) on edge of the clock signal (also referred to as a recovered clock edge). To perform the eye scan, the eye scan logic circuit 320 may configure the offset sampling circuit 318 to sample the input signal at a time up to half the UI before or after this recovered clock edge. In particular, the phase offset may refer to a difference between the recovered clock edge and the time when the signal is sampled.

The eye scan information may be used by the control unit 310 to tune the common-mode adjustment circuit 304 to remove common-mode current from the input photocurrent until the relative height metric (e.g., a height difference or a height ratio) between the first height and the second height is determined to be lower than or equal to the threshold value (e.g., a threshold height difference or a threshold ratio). Once the relative height metric is set at a value lower than or equal to the threshold value, the adjusted input current gets confined within the input operating range of the current-to-voltage converter 312 resulting in reduced distortions of signal and the BER of receiver 300 reduces.

In the description hereinafter, several operations performed by the control unit 110 will be described with help of flow diagrams depicted in FIGS. 5-8. For illustration purposes, the flow diagrams, depicted in FIGS. 5-8, are described in conjunction with the receiver 100 of FIG. 1 and the eye diagrams of FIGS. 2A-2B, however, the methods of FIGS. 5-8 should not be construed to be limited to the example configuration of the receiver 100. For example, the methods of FIGS. 5-8 may also apply to the receiver 300 and may be performed by the control unit 310. FIGS. 1 and 2A-2B are referenced concurrently during the description of FIGS. 5-8. In particular, the methods described in FIGS. 5-8 may represent an example logical flow of some of the several operations performed by the control unit 110. However, in some other examples, the order of execution of the blocks depicted in FIGS. 5-8 may be different than the order shown. The operations at various blocks may be performed in series, in parallel, or in a series-parallel combination. For example, the method blocks 502, 504 in FIG. 5, the method blocks 702, 704 in FIG. 7, or the method blocks 802, 804 in FIG. 7 may be performed in parallel during the execution of the respective methods.

Figure 5:
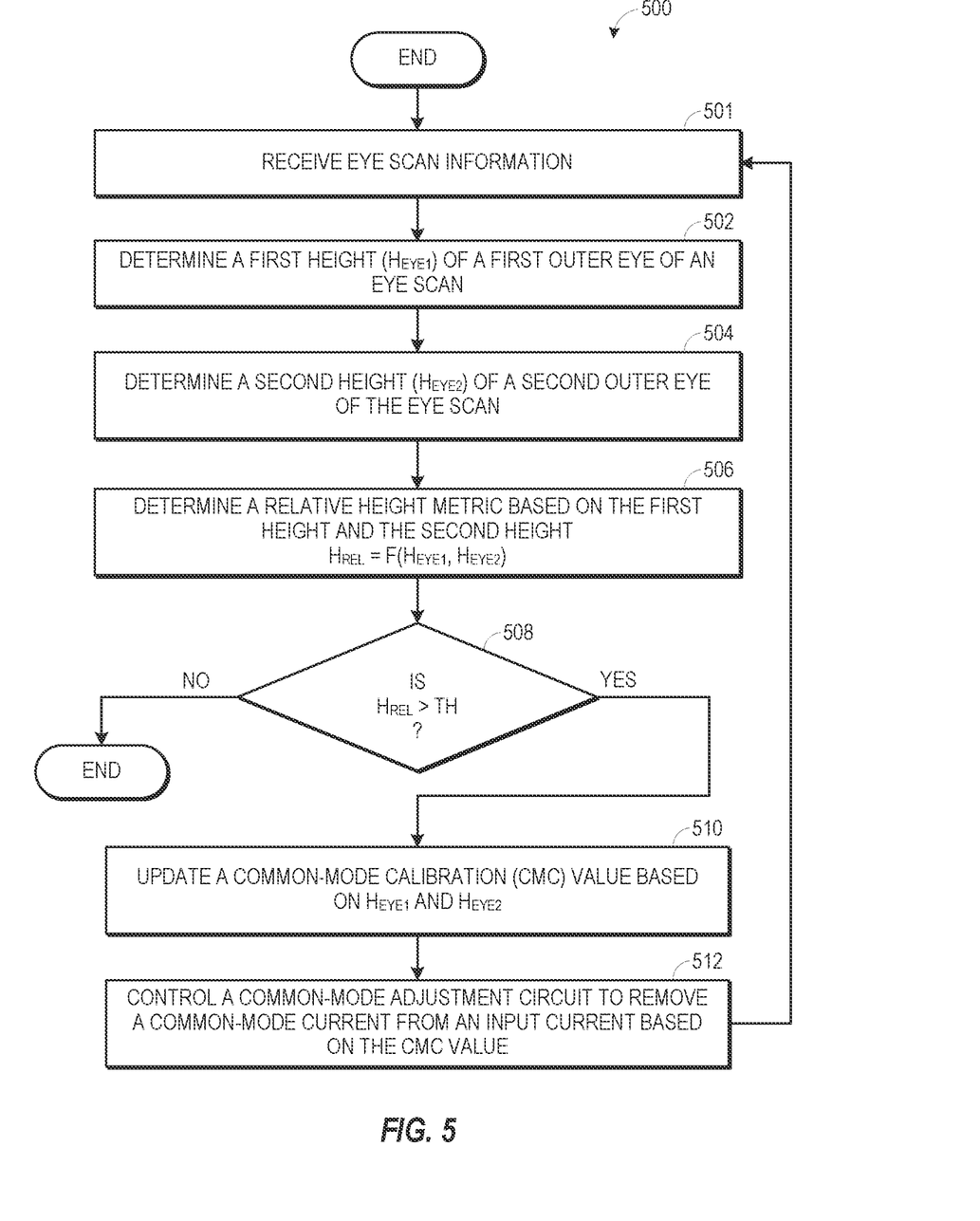
FIG. 5 is a flow diagram of an example method for tuning a common-mode adjustment circuit of an optoelectronic receiver.

Referring now to FIG. 5, a flow diagram of an example method 500 for tuning a common-mode adjustment circuit, such as, the common-mode adjustment circuit 104 to control the removal of a common-mode current from an input photocurrent of the receiver 100 is presented. The method 500 may be performed during a training phase (e.g., upon initialization) of the receiver 100. In some examples, to perform the method 500, the receiver 100 may be supplied with a training data signal at a predetermined data rate, for example, 28 Ghz to 56 Ghz for a PAM4 signal, and an eye scan may be performed (e.g., using the eye scan circuit 108) to generate the eye scan information that may represent a distribution of the probability of a signal having given voltage value at a given phase offset.

The method 500 may begin at block 501, where the control unit 110 receives the eye scan information. In some examples, the control unit 110 receives the eye scan information continuously during the training phase. In some examples, at block 501, the control unit 110 instructs the eye scan circuit 108 to perform an eye scan and return the eye scan information to the control unit 110. As previously noted, the eye scan information may be graphically represented in the form of an eye diagram that comprises three eyes 212, 214, and 216 (see FIGS. 2A-2B) for the PAM4 data signal.

At block 502, the control unit 110 determines a first height of the first outer eye 212. In some examples, the control unit 110 may determine the height $H_{EYE1}$ based on a first outer eye upper voltage and a first outer eye lower voltage (labeled in the eye diagrams 200A and 200B, for example) that are derived by the control unit 110 based on the eye scan information received from the eye scan circuit 108. In one example, the first height may be determined according to the relationship of equation (1).

$$H_{EYE1} = V_{U1} - V_{L1} \tag{1}$$

In another example, the first height may be determined based on a standard deviation ($\sigma$) of voltage values at each of $V_{U1}$ and $V_{L1}$ according to the relationship of equation (2).

$$H_{EYE1} = (V_{U1} - 3\sigma) - (V_{L1} + 3\sigma) \tag{2}$$

Further, at block 504, the control unit 110 determines a second height of the second outer eye 216 based on a second outer eye upper voltage and a second outer eye lower voltage (labeled in the eye diagrams 200A and 200B, for example) that are derived by the control unit based on the eye scan information received from the eye scan circuit 108. In one example, the second height may be determined according to the relationship of equation (3).

$$H_{EYE2} = V_{U2} - V_{L2} \tag{3}$$

In another example, the first height may be determined based on a standard deviation ($\sigma$) of voltage values at each of $V_{U1}$ and $V_{L1}$ according to the relationship of equation (2).

$$H_{EYE2}=(V_{U2}-3\sigma)-(V_{L2}+3\sigma) \quad (4)$$

At block 506, the control unit 110 may determine a relative height metric ($H_{REL}$) based on the first height and the second height. The relative height metric may be determined as a function of the first height and the second height represented in equation 5.

$$H_{REL}=f(H_{EYE1},H_{EYE2}) \quad (5)$$

Figure 7:
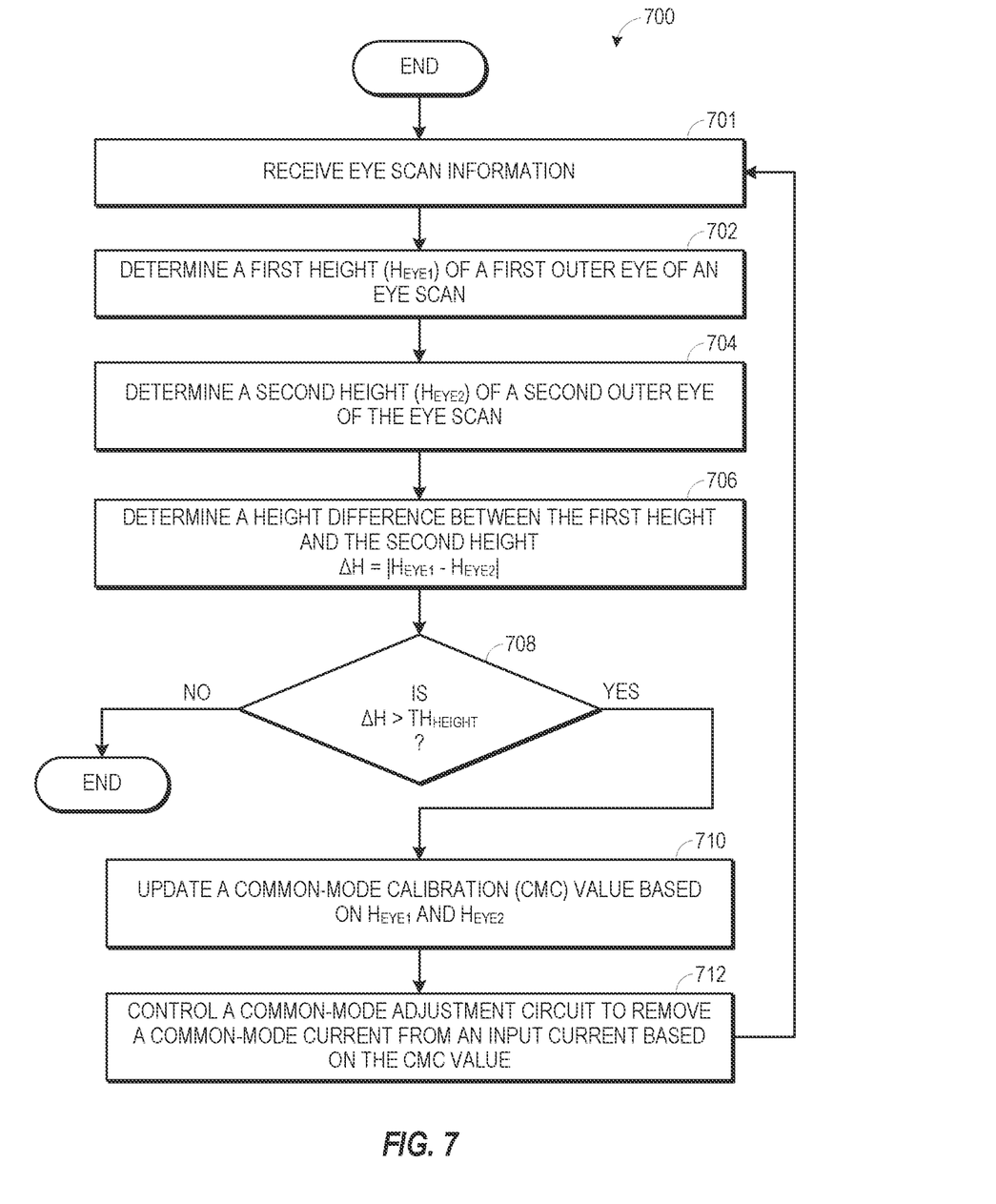
FIG. 7 is a flow diagram of another example method for tuning a common-mode adjustment circuit in an optoelectronic receiver.

In one example, the relative height metric may be a difference between the first height and the second height (see FIG. 7). In another example, the relative height metric may be a ratio of the first height and the second height (see FIG. 8). It may be noted that in other examples the relative height metric may be any other function without limiting the scope of the present disclosure.

Further, at block 508, the control unit 110 may compare the relative height metric with a threshold value (TH) to determine whether the relative height metric is greater than the threshold value. The threshold value may be a customizable margin value that can be set based on tolerance allowable in the performance of the receiver 100. For example, the threshold value may be set based on an allowable value of BER for the receiver for acceptable performance of the receiver 100. At block 508, if it is determined that the relative height metric is greater than the threshold value, the control unit 110, at block 510, may update a CMC value based on the first height and the second height. In particular, the CMC value may be incremented or decremented based on the first height and the second height. Details of updating the CMC value are described in conjunction with the method of FIG. 6. Furthermore, at block 512, the control unit 110 tunes common-mode adjustment circuit 104 to remove the common-mode current from the input photocurrent based on the common-mode calibration value. In particular, the control unit 110 sends a command or control signal instructing the common-mode adjustment circuit 104 to either increase or decrease the amount of the common-mode current removed from the input photocurrent. In particular, in one example, the command or control signal may include an updated CMC value (e.g., a binary-encoded value) based on which the common-mode adjustment circuit increases or decreases the amount the current being drawn from the input photocurrent thereby changing the level of the common-mode current. After operating on block 512, the control may again pass to block 501.

In some examples, when the relative height metric becomes smaller than or equal to the threshold value, the first height and the second height become equal or substantively similar to each other which is indicative of the common-mode adjustment circuit 104 being properly tuned. Accordingly, at block 508, if it is determined that the relative height metric is not greater than the threshold value (i.e., $H_{REL} \le TH$), the control unit 110 may terminate the method 500.

Figure 6:
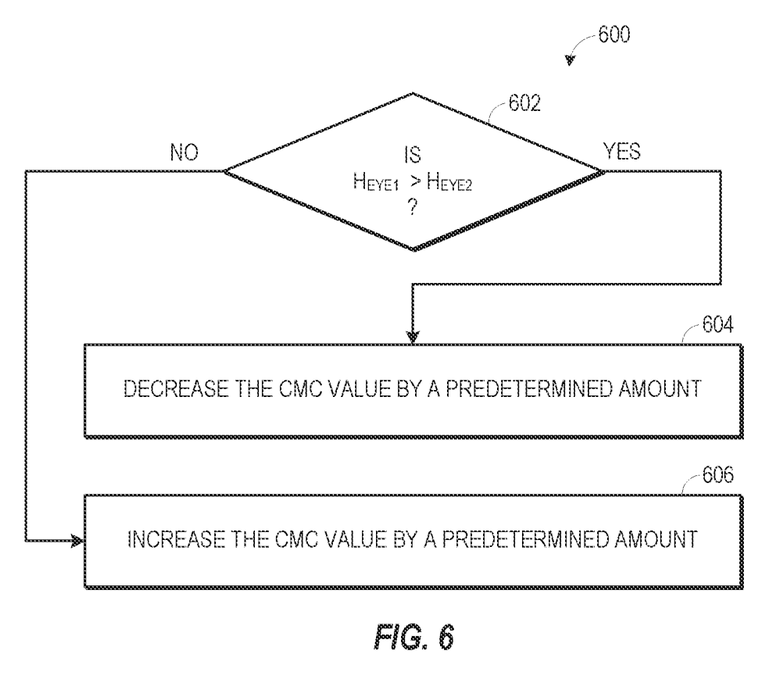
FIG. 6 is a flow diagram of an example method for updating a common-mode calibration (CMC) value for a common-mode adjustment circuit in an optoelectronic receiver.

FIG. 6 is a flow diagram of an example method 600 for updating the CMC value for the common-mode adjustment circuit 104 in the receiver 100. In particular, the method 600 includes example steps to be carried out to update the CMC value indicated at block 510 of FIG. 5. In some examples, during the training phase and before updating the CMC value, the control unit 110 may have initialized the CMC value to the CMC baseline amount.

At block 602, the control unit 110 may perform a check to determine whether the first height is greater than the second height. At block 602, if it is determined that the first height is greater than the second height, at block 604, the control unit 110 may decrease the CMC value. In some examples, the control unit 110 may decrease the CMC value by a predetermined amount. However, at block 602, if it is determined that the first height is not greater than the second height, at block 606, the control unit 110 may increase the CMC value. In some examples, the control unit 110 may increase the CMC value by the predetermined amount. In particular, at blocks 604 and 606, a previously set amount (e.g., the baseline CMC value for the first instance of updating the CMC value) of the CMC value may be decremented or incremented by the predetermined amount.

FIG. 7 is a flow diagram of another example method 700 for tuning the common-mode adjustment circuit 104 to remove the common-mode current from an input photocurrent. In particular, the method 700 is an example representative of the method 500 of FIG. 5 and includes certain steps that are similar to those described in FIG. 5, a description of which is not repeated herein. For example, blocks 701, 702, 704, 710, and 712 of FIG. 7 are similar to blocks 501, 502, 504, 510, and 512 of FIG. 5. In the method 700, after the first height and the second height are determined, the control unit 110, at block 706, may determine a height difference ($\Delta H$) between the first height and the second height. In one example, the height difference may be an absolute difference of heights $H_{EYE1}$ and $H_{EYE2}$ represented using an example relationship of equation 6.

$$\Delta H=|H_{EYE1}-H_{EYE2}| \quad (6)$$

Further, at block 708, the control unit 110 may compare the height difference with a threshold height difference ($TH_{\Delta H}$) to determine whether the relative height difference is greater than the threshold height difference. The threshold height difference may be a customizable margin value that can be set based on tolerance allowable in the performance of the receiver 100. For example, the threshold height difference may be set based on an allowable value of BER for the receiver for acceptable performance. In one example, a value of the threshold height difference may be set to zero (0). In another example, the threshold height difference may be set to a value equivalent to a predetermined percentage (e.g., between 5% to 10%) of the first height. In yet another example, the threshold height difference may be set to a value equivalent to a predetermined percentage (e.g., between 5% to 10%) of the second height. At block 708, if it is determined that the height difference is greater than the threshold height difference (i.e., $\Delta H > TH_{\Delta H}$), the control unit 110, at block 710, may update a CMC value based on the first height and the second height in a similar fashion as described in conjunction with FIG. 6, in some examples.

In some examples, when the height difference becomes smaller than or equal to the threshold height difference, the first height and the second height become equal or substantively similar to each other which is indicative of the common-mode adjustment circuit being properly tuned to restrict the level of the common-mode current in the adjusted input current below the predetermined magnitude. Accordingly, at block 708, if it is determined that the height difference is not greater than the threshold height difference (i.e., $\Delta H \le TH_{\Delta H}$), the control unit 110 may terminate the method 700.

Figure 8:
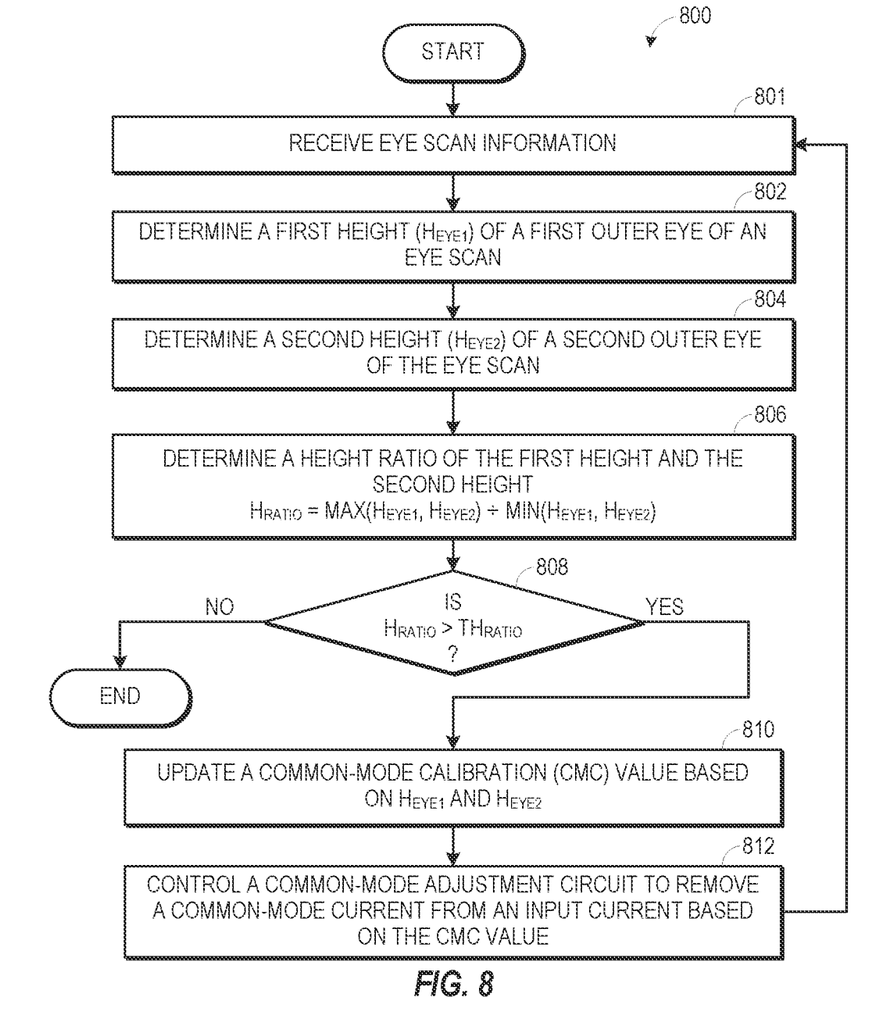
FIG. 8 is a flow diagram of yet another example method for tuning a common-mode adjustment circuit in an optoelectronic receiver.

Turning now to FIG. 8, a flow diagram of another example method 800 for tuning the common-mode adjustment circuit 104 is presented. In particular, the method 800 is an example representative of the method 500 of FIG. 5 and includes certain steps that are similar to those described in FIG. 5, a description of which is not repeated herein. For example, blocks 801, 802, 804, 810, and 812 of FIG. 8 are similar to blocks 501, 502, 504, 510, and 512 of FIG. 5. In the method 800, after the first height and the second height are determined, the control unit 110, at block 806, may determine a height ratio ($H_{RATIO}$) between the first height and the second height. In one example, the height ratio may be a ratio of a maximum of the heights $H_{EYE1}$, $H_{EYE2}$ to a minimum of the heights $H_{EYE1}$, $H_{EYE2}$, as represented with an example relationship of equation 7.

$$H_{RATIO} = \frac{\text{MAX}(H_{EYE1}, H_{EYE2})}{\text{MIN}(H_{EYE1}, H_{EYE2})} \qquad (7)$$

Further, at block 808, the control unit 110 may compare the height ratio with a threshold ratio ($TH_{RATIO}$) to determine whether the height ratio is greater than the threshold ratio ($TH_{RATIO}$). The threshold ratio may be a customizable margin value that can be set based on tolerance allowable in the performance of the receiver 100. For example, the threshold ratio may be set based on an allowable value of BER for the receiver for acceptable performance. In one example, a value of the threshold ratio may be set to one (1). At block 708, if it is determined that the height ratio is not greater than the threshold ratio (i.e., $H_{RATIO} \leq TH_{RATIO}$), the control unit 110 may terminate the method 800. However, at block 808, if it is determined that the height ratio is greater than the threshold value (i.e., $H_{RATIO} > TH_{RATIO}$), the control unit 110, at block 810, may update a CMC value based on the first height and the second height in a similar fashion as described in conjunction with FIG. 6, in some examples.

Figure 9:
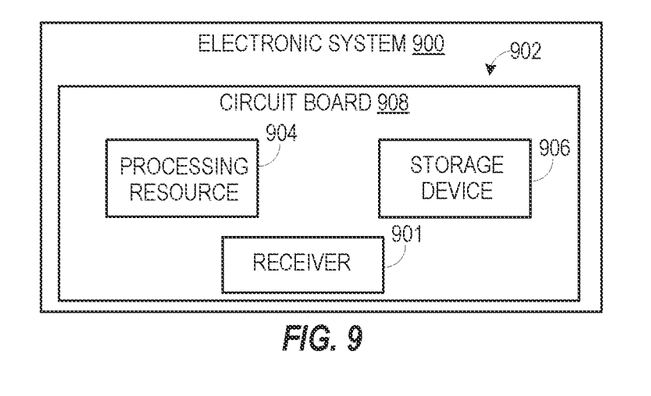
FIG. 9 is a block diagram of an example electronic system including an example optoelectronic receiver.

FIG. 9 is a block diagram of an example electronic system 900 including an example receiver 901. Examples of the electronic system 900 may include, but are not limited to, computers (stationary or portable), servers, storage systems, wireless access points, network switches, routers, docking stations, printers, or scanners. The electronic system 900 may be offered as a stand-alone product, a packaged solution, and can be utilized on a one-time full product/solution purchase or pay-per-use basis. The electronic system 900 may include one or more multi-chip modules, for example, a multi-chip module (MCM) 902 to process and/or store data. In some examples, the MCM 902 may include a processing resource 904 and a storage medium 906 mounted on a circuit board 908. Also, in some examples, the MCM 902 may host a receiver 901 on the circuit board 908. In some other examples, one or more of the processing resource 904, the storage medium 906, and a receiver 901 may be hosted on separate MCM (not shown). The circuit board 908 may be a printed circuit board (PCB) that includes several electrically conductive traces (not shown) to interconnect the processing resource 904, the storage medium 906, and the receiver 901 with each other and/or with other components disposed on or outside of the PCB.

The processing resource 904 may be a physical device, for example, one or more central processing units (CPUs), one or more semiconductor-based microprocessors, microcontrollers, one or more graphics processing unit (GPU), an ASIC, an FPGA, other hardware devices, or combinations thereof, capable of retrieving and executing the instructions stored in the storage medium 906. The processing resource 904 may fetch, decode, and execute the instructions stored in the storage medium 906. As an alternative or in addition to executing the instructions, the processing resource 904 may include at least one integrated circuit (IC), control logic, electronic circuits, or combinations thereof that include a number of electronic components. The storage medium 906 may be any electronic, magnetic, optical, or any other physical storage device that contains or stores instructions that are readable and executable by the processing resource 904. Thus, the storage medium 906 may be, for example, Random Access Memory (RAM), non-volatile RAM (NVRAM), an Electrically Erasable Programmable Read-Only Memory (EEPROM), a storage device, an optical disc, and the like. In some embodiments, the storage medium 906 may be a non-transitory storage medium, where the term "non-transitory" does not encompass transitory propagating signals. Further, in some examples, the receiver 901 may be any of the receivers 100 or 300.

The terminology used herein is for the purpose of describing example embodiments only and is not intended to be limiting. As used herein, the singular forms "a," "an," and "the" are intended to include the plural forms as well, unless the context indicates otherwise. The term "plurality," as used herein, is defined as two or more than two. The term "coupled," as used herein, is defined as connected, whether directly without any intervening elements or indirectly with at least one intervening element, unless otherwise indicated. The term "and/or" as used herein refers to and encompasses any or all possible combinations of one or more of the associated listed items. The presence of broadening words and phrases such as "one or more," "at least," "but not limited to" or other like phrases in some instances shall not be read to mean that the narrower case is intended or required in instances where such broadening phrases may be absent.

The foregoing description of various examples has been presented for purposes of illustration and description. The foregoing description is not intended to be exhaustive or limited to the examples disclosed, and modifications and variations are possible in light of the above teachings or may be acquired from the practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products. Further, in the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

What is claimed is:

1. A method, comprising:
   determining, by a control unit, a first height of a first outer eye and a second height of a second outer eye based on eye scan information defining at least three eyes in an eye diagram, wherein the eye scan information is based on an input photocurrent generated by a photodetector in an optoelectronic receiver based on a received multi-level pulse amplitude modulated (PAM) data signal, wherein the input photocurrent comprises a common-mode current that is controlled by a common-mode adjustment circuit disposed in the optoelectronic receiver and coupled to the photodetector and the control unit;
   generating a differential voltage based on an adjusted input current, by:

receiving the adjusted input current and generating a single-ended voltage; and
receiving the single-ended voltage and generating the differential voltage by removing an average voltage of the single-ended voltage from the single-ended voltage;
determining, by the control unit, whether a relative height metric based on the first height and the second height is greater than a threshold value;
in response to determining that the relative height metric is greater than the threshold value:
updating, by the control unit, a common-mode calibration value based on the first height and the second height; and
tuning, by the control unit, the common-mode adjustment circuit to remove a portion of the common-mode current from the input photocurrent based on the common-mode calibration value.

2. The method of claim 1, further comprising repeating the steps of determining the first height and the second height, determining whether the relative height metric is greater than the threshold value, updating the common-mode calibration value, and tuning the common-mode adjustment circuit until the relative height metric becomes smaller than or equal to the threshold value.

3. The method of claim 1, wherein the multi-level PAM optical signal is a PAM four-level (PAM4) optical signal.

4. The method of claim 1, wherein the first outer eye and the second outer eye are the outermost eyes in the eye diagram.

5. The method of claim 1, wherein the eye scan information is generated based on the differential voltage, wherein the differential voltage is generated based on an adjusted input current.

6. The method of claim 1, wherein updating the common-mode calibration value comprises increasing the common-mode calibration value by a predetermined amount in response to determining that the first height is smaller than the second height.

7. The method of claim 1, further comprising determining whether the first height is greater than the second height, wherein updating the common-mode calibration value comprises decreasing the common-mode calibration value by a predetermined amount in response to determining that the first height is greater than the second height.

8. The method of claim 1, wherein the relative height metric is a difference between the first height and the second height, and wherein the threshold value is a threshold height difference.

9. The method of claim 1, wherein the relative height metric is a ratio of the first height and the second height, and wherein the threshold value is a threshold ratio.

10. The method of claim 1, wherein removal of the portion of the common-mode current from the input photocurrent causes a reduction in a bit error rate of the optoelectronic receiver.

11. A receiver, comprising:
a photodetector to receive a PAM4 optical signal and generate an input photocurrent;
a common-mode adjustment circuit coupled to the photodetector to receive the input photocurrent and to generate an adjusted input current by reducing a common-mode current from the input photocurrent;
an analog front-end (AFE) coupled to the common-mode adjustment circuit, wherein the AFE generates a differential voltage based on the adjusted input current, wherein the AFE comprises:
a current-to-voltage converter coupled to the common-mode adjustment circuit to receive the adjusted input current and generate a single-ended voltage; and
a differential voltage generator coupled to the current-to-voltage converter to receive the single-ended voltage and generate the differential voltage by removing an average voltage of the single-ended voltage from the single-ended voltage;
an eye scan circuit coupled to the AFE to generate eye scan information based on the differential voltage, wherein the eye scan information defines a first outer eye and a second outer eye in an eye diagram; and
a control unit coupled to the eye scan circuit and the common-mode adjustment circuit, wherein the control unit tunes the common-mode adjustment circuit based on a height difference between a first height of the first outer eye and a second height of the second outer eye to remove a portion of the common-mode current from the input photocurrent.

12. The receiver of claim 11, wherein the control unit:
determines whether the height difference is greater than a threshold height difference; and
updates a common-mode calibration value based on the first height and the second height in response to determining that height difference is greater than the threshold height difference, wherein the control unit tunes the common-mode adjustment circuit to remove the common-mode current from the input photocurrent based on the common-mode calibration value.

13. The receiver of claim 12, wherein the control unit:
determines whether the first height is smaller than or equal to the second height; and
increases the common-mode calibration value by a predetermined amount in response to determining that the first height is smaller than or equal to the second height.

14. The receiver of claim 12, wherein the control unit:
determines whether the first height is greater than the second height; and
decreases the common-mode calibration value by a predetermined amount in response to determining that the first height is greater than the second height.

15. The receiver of claim 11, wherein the control unit tunes the common-mode adjustment circuit to remove the common-mode current such that the adjusted input current is maintained within an input operating range of the current-to-voltage converter.

16. An electronic system, comprising:
a circuit board;
a processing resource mounted on the circuit board;
a storage medium mounted on the circuit board and communicatively coupled to the processing resource; and
a receiver communicatively coupled to the processing resource and comprising:
a photodetector to receive a PAM4 optical signal and generate an input photocurrent;
a common-mode adjustment circuit coupled to the photodetector to receive the input photocurrent and to generate an adjusted input current by reducing a common-mode current from the input photocurrent;
an AFE coupled to the common-mode adjustment circuit, wherein the AFE generates a differential voltage based on the adjusted input current, wherein the AFE comprises:
a current-to-voltage converter coupled to the common-mode adjustment circuit to receive the adjusted input current and generate a single-ended voltage; and a differential voltage generator coupled to the current-to-voltage converter to receive the single-ended voltage and generate the differential voltage by removing an average voltage of the single-ended voltage from the single-ended voltage;

an eye scan circuit coupled to the AFE to generate eye scan information based on the differential voltage, wherein the eye scan information defines a first outer eye and a second outer eye in an eye diagram; and a control unit coupled to the eye scan circuit and the common-mode adjustment circuit, wherein the control unit tunes the common-mode adjustment circuit based on a height ratio of a first height of the first outer eye and a second height of the second outer eye to remove a portion of the common-mode current from the input photocurrent based.

17. The electronic system of claim 16, wherein the control unit:

determines whether the height ratio is greater than a threshold ratio; and updates a common-mode calibration value based on the first height and the second height in response to determining that the height ratio is greater than the threshold ratio, wherein the control unit tunes the common-mode adjustment circuit to remove the common-mode current from the input photocurrent based on the common-mode calibration value.

18. The electronic system of claim 17, wherein the control unit:

determines whether the first height is smaller than or equal to the second height; and increases the common-mode calibration value by a predetermined amount in response to determining that the first height is smaller than or equal to the second height, or decreases the common-mode calibration value by a predetermined amount in response to determining that the first height is greater than the second height.

* * * * *